United States Patent [19]

Channing et al.

[11] 4,367,582
[45] Jan. 11, 1983

[54] METHOD FOR MANUFACTURING A BATTERY HAVING A TEMPORARY SIDE TERMINAL THEREON

[75] Inventors: Harry M. Channing, South Lake Tahoe, Calif.; John M. Nees, Wyomissing; William J. Eberle, Reading, both of Pa.

[73] Assignee: General Battery Corporation, Reading, Pa.

[21] Appl. No.: 189,044

[22] Filed: Sep. 22, 1980

Related U.S. Application Data

[62] Division of Ser. No. 121,780, Feb. 14, 1980, Pat. No. 4,263,379.

[51] Int. Cl.³ .................... H01M 2/06; H01M 2/30
[52] U.S. Cl. ................................................ 29/623.1
[58] Field of Search .................. 429/160, 178, 179; 204/2.1; 29/623.1, 623.2, 730

[56] References Cited

U.S. PATENT DOCUMENTS

| | | | |
|---|---|---|---|
| 3,607,441 | 9/1971 | Mix | 29/623.1 |
| 3,632,450 | 1/1972 | Coffey et al. | 429/179 |
| 3,711,335 | 1/1973 | Daniel | 429/161 |
| 3,928,079 | 12/1975 | Jennings et al. | 429/179 |
| 4,154,907 | 5/1979 | Crow | 429/179 |

Primary Examiner—Francis S. Husar
Assistant Examiner—Jonathan L. Scherer
Attorney, Agent, or Firm—Benasutti Associates, Ltd.

[57] ABSTRACT

A method for manufacturing a battery having a temporary side terminal cast integrally with the permanent side terminal.

1 Claim, 4 Drawing Figures 4,367,582

METHOD FOR MANUFACTURING A BATTERY HAVING A TEMPORARY SIDE TERMINAL THEREON

CROSS-REFERENCE TO RELATED APPLICATIONS

This application is a division of Ser. No. 121,780, now U.S. Pat. No. 4,263,379 filed on Feb. 14, 1980.

BACKGROUND OF THE INVENTION

1. Field of the Invention

The instant invention is intended for use in the field of lead acid battery manufacturing. In particular, the disclosed invention is intended for use in the forming and charging of side terminal batteries.

The side terminal battery differs from the top terminal battery in that side terminal batteries do not have the commonly known terminal posts protruding beyond the upper surface of the battery case. As a result, connection to side terminal batteries are generally achieved through a fastening means which is secured to threaded means provided in the side terminal for drawing a battery cable into intimate contact with the side terminal.

2. Description of the Prior Art

The most common prior art device for forming and charging side terminal batteries, is an adaptor which is configured to look much like the post, negative or positive which protrude from the top of a common top terminal battery. This adaptor has a bolt or fastening means molded therein which is used to secure the adaptor to the side terminal. The purpose is to draw the adaptor and side terminal into intimate contact. The adaptor must be brought into intimate contact with the side terminal so as to avoid losses in charging and forming energy.

A second prior art device as disclosed in U.S. Pat. No. 3,607,441 is a molded two piece side terminal, which is intended as a terminal carrier to facilitate handling and positioning of the terminal during processing and then discarded after the battery is finished.

This second prior art device basically comprises an integral post and spoollike arrangement which is molded with the side terminal. A claw like adaptor cable is affixed to the spool portion of the temporary terminal during forming and charging operations. When the battery has been fully formed and is ready for shipping, the spoollike portion of the terminal is removed.

SUMMARY OF THE INVENTION

The disclosure sets forth a temporary side terminal which is cast integrally with the permanent side terminal. The temporary side terminal is used in the forming and charging operations during the manufacture of a side terminal battery. Prior to shipping the side terminal battery to the customer, the manufacturer would remove the temporary side terminal by machining, sawing, buffing or any of the other various methods available for removing metals.

The temporary side terminal of the instant invention is completely compatible with equipment which is presently installed in battery manufacturing operations for the manufacture of top terminal batteries. No special adaptor or modification is necessary in the forming and charging operation regardless of whether the battery to be produced is a top or side terminal battery.

It is an object of the instant invention to provide a temporary side terminal which is compatible with the equipment used in charging and forming top terminal batteries.

It is an object of the instant invention to provide a side terminal battery which does not have an energy loss associated with adapting standard top terminal equipment to the side terminal use.

DESCRIPTION OF THE PREFERRED EMBODIMENT

Figure 1:
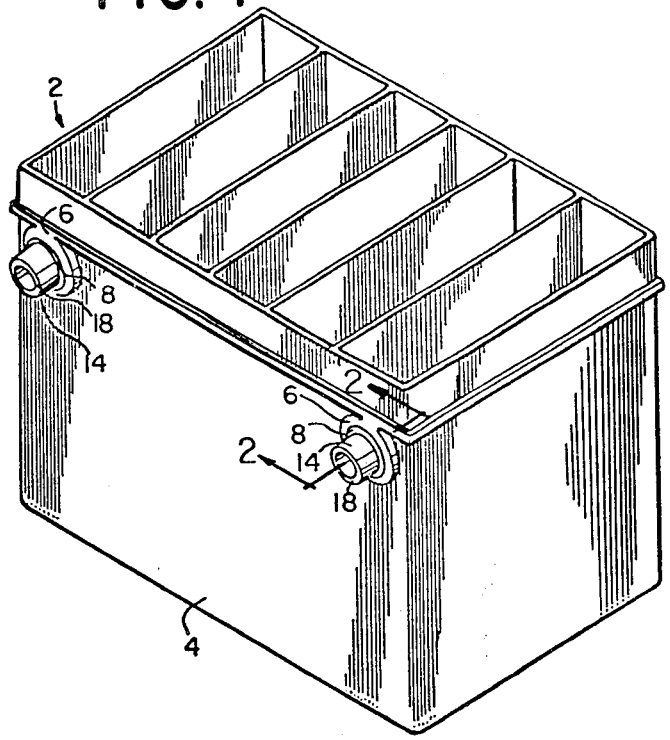
FIG. 1, is an orthographic projection of a battery case having side terminals according to the instant invention.
Figure 2:
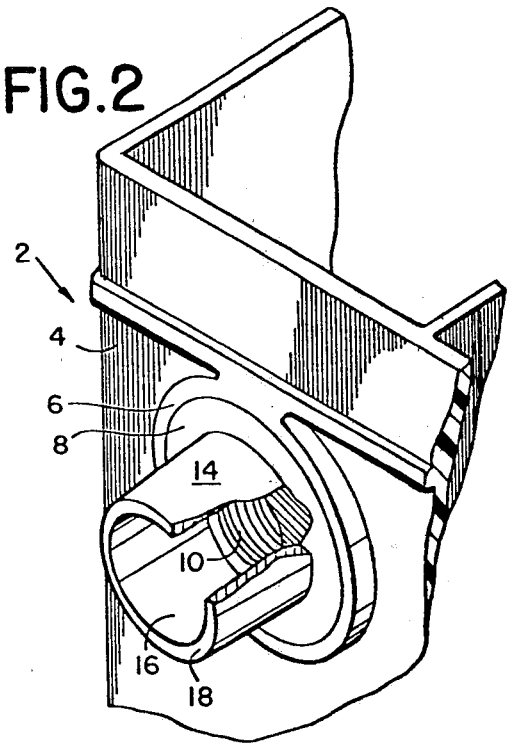
FIG. 2, is an exploded view of one side terminal with a partial section.

The description of the preferred embodiment shall be set forth with reference to the attached figures wherein a numeral refers to like parts in all figures Referring now to FIG. 1, there is shown a battery case 2, which is of the variety generally known as a side terminal battery. This type of battery has a generally smooth upper surface and the terminal for making the electrical interconnections are positioned on the side of the battery case generally in the area just below the top of the battery case. The side wall 4 of the battery case is generally planar and has thereon two shoulders 6. These shoulders are positioned one behind each terminal and are intended to strengthen the battery case in the area of the terminal. The permanent side terminal 8, in the final configuration as seen by a consumer, has the appearance of a flat washer. Located in the center of the permanent terminal in the area which would be the hole through the flat washer is a threaded insert 10. The insert 10 is intended to accept a mechanical fastening device which will draw a battery cable connector, not shown, into intimate contact with side terminal 8, when the battery is put to its intended use. The temporary terminal 14 is cast integral with and adjacent the flat washer like portion.

The temporary terminal 14 may be cast according to the dimensions of a positive terminal, generally the larger, or a negative terminal, generally the smaller. By casting the terminal 14 according to the dimensions of the positive or negative terminals which are generally found on top terminal batteries, it is therefore possible to connect the forming and charging equipment directly to the terminal 14 in the same manner as would be normally used in attaching the equipment to a top terminal battery.

The temporary terminal 14, has a hollow core 16, which extends into the plane of a permanent terminal 8. In this manner it can be seen that the connection means 10 is preserved free of extraneous lead in the casting operation and is not marred by the use of the temporary side terminal.

The thickness of wall 18 in forming a temporary side terminal 14 is variable and as may be appreciated could be modified in view of different current carrying requirements.

Figure 3:
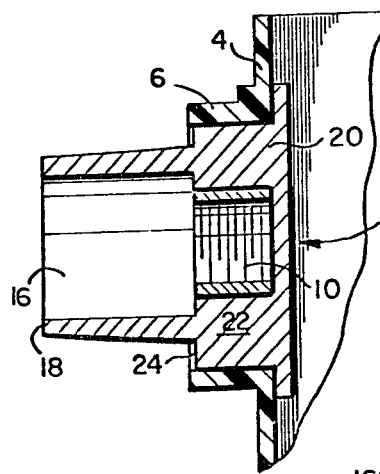
FIG. 3 is a section taken along the lines 2—2 of FIG. 1.

Referring now to FIG. 3, there is the section through the lines 2—2 of FIG. 1. Battery case 2 has side wall 4 and shoulder portion 6 which define a passageway through the wall of the battery case. The side terminal 8 is cast with a shoulder portion 20 which extends completely around the terminal body 22 and abuts the interior of side wall 4 in a sealing relationship with the passage therethrough. The body portion 22 of the terminal extends through the side wall to a point just within the plane defining the outer edge of the shoulder 6. It is the outer edge 24 of the body portion 22 which is seen as a flat washer like portion of the side terminal 8 in FIG. 1.

In the forming and charging operation performed in the manufacture of a lead acid storage battery, the side terminal battery would have cast thereon a temporary positive and negative posts as described above. This terminal would permit the use of standard forming and charging equipment, as used on top terminal batteries during the forming and charging operations. After completing the manufacturing operations, temporary terminal 14 is machined from the permanent side terminal. The removal of the temporary terminal in this manner eliminates the need to perform the buffing operation which is undertaken in the prior art to present the end user with a side terminal free and clear of any manufacturing scars, such as caused by using an adaptor terminal.

Figure 4:
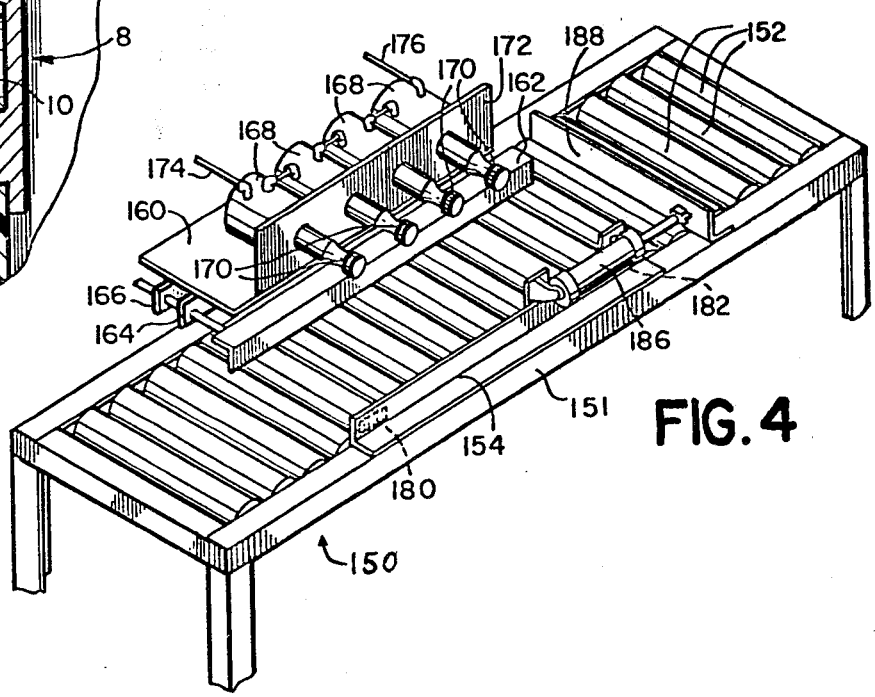
FIG. 4, is an orthographic projection apparatus suitable for removing the temporary side terminal of the instant invention.

An apparatus which applicants have found useful for removing the side terminal is shown in FIG. 4. The apparatus 150 comprises a rectangular frame 151, which has a plurality of rollers 152 mounted therein. A rail 154 is mounted on one longitudinal side of the frame 151. The rail 154 is essentially an angle iron which has been mounted on a frame so as to form a partial wall above the rollers 152. Directly opposite the rail 154 there is mounted a flat support table 160. The table 160 is mounted on a lead screw so that it may be moved toward and away from the rail 154.

A rail 162 is mounted forward of the table 160 and opposite the rail 154. The rail 162 is mounted to table 160 via the mounting rods 164 which are journaled through the collars 166 of the table 160. The rail 162 is likewise movable toward and away from rail 154 via a lead screw.

A plurality of milling heads 168 are mounted on table 160. The milling heads 168 have tools which remove the temporary terminal from the battery. The heads 168 and the tools 170 are adjustable within the forward mount 172 so that they may be positioned according to the actual distance between the side terminals on the batteries. Milling heads 168 are driven by a hydraulic pump which has a inlet at 174 and a return at 176. As can be seen the milling head 168 are connected in series to assure an even pressure to each of the respective heads.

Mounted on rail 154 there is a first limit switch 180 shown in a hidden view and a second limit switch 182, not shown but behind rail 154, which are disposed at a distance which is equal to twice the width of a given battery. The distance between limit switches 180 and 182 is such that two batteries may be operated on in a single cycle. As will be obvious to those skilled in the art the limit switches 180 and 182 are adjustable so that different battery sizes may be accomodated by the apparatus.

A hydraulic cylinder 186 is mounted on frame 154 at the off loading end thereof. Cylinder 186 operates a pivot arm 188, which is essentially a piece of angle iron. The purpose of the cylinder 186 and the pivot arm 188 is to essentially form the third side of a rectangle within which the batteries to be operated on are confined.

In operations the batteries with the temporary side terminals still affixed thereto are brought in from the left hand side of the apparatus 150 and moved in a rightward direction. The batteries move through the first limit switch 180 the apparatus is signaled for the hydraulic cylinder to activate the arm 188 which will move across and prevent the progress of the battery beyond a fixed point. As the two batteries make the limit switches 180 and 182, the table 160 will begin to move toward rail 154. When this operation begins the rail 162 will first contact the batteries so that they are retained between rail 162 and rail 154 and within the limit switches 180 and 182. The milling heads 168 will begin to rotate so as to mill the temporary terminals from the battery. The table 160 via the lead screw will continue to move inwardly until a limit switch, not shown, which is positioned on the rails 164 is made. At this point the distance of travel of the tool 170 is assured so that it does not go beyond the fixed limits which have been set by the side rails 162, 158 and the limit switch on rails 164. As an additional feature a timed override, a fraction of a second, is permitted to assure that a full milling operation is completed on each of the terminals. When the limit switch which is mounted on rails 164 has been made and the time override has lapsed, the table 160 will be reversed by the hydaulic logic and will be moved away from the batteries. At that point the table 160 has returned beyond the position where the rail 162 first contacted the batteries. The hydraulic cylinder 186 will be activated and thereby swing the arm 188 out of the path of travel and the batteries will be free to move off the end of the conveyor.

Having fully disclosed our invention it will be obvious that the disclosed temporary side terminal may be modified without departing from the spirit of the invention.

We claim:

1. A method for manufacturing a lead acid storage battery having electrical terminals in the side wall of said battery for achieving electrical interconnections, said method comprising the steps of:
   (a) molding a battery case;
   (b) casting electrical terminals, said electrical terminals having a portion thereof which extends through the side wall of said battery case and further having a conical outer surface which tapers toward the free end thereof and a passageway which extends from the free end thereof through to said terminal through said battery case;
   (c) assembling battery components to complete the said storage battery;
   (d) forming and charging said battery as formed in step (c);
   (e) removing said portion of the battery terminal having a conical outer surface which tapers toward the free end thereof and a passageway which extends from the free end thereof through to said terminal in said battery case.

* * * * *